(No Model.)
G. T. WARWICK.
WHEEL FOR VEHICLES.
No. 315,094. Patented Apr. 7, 1885.
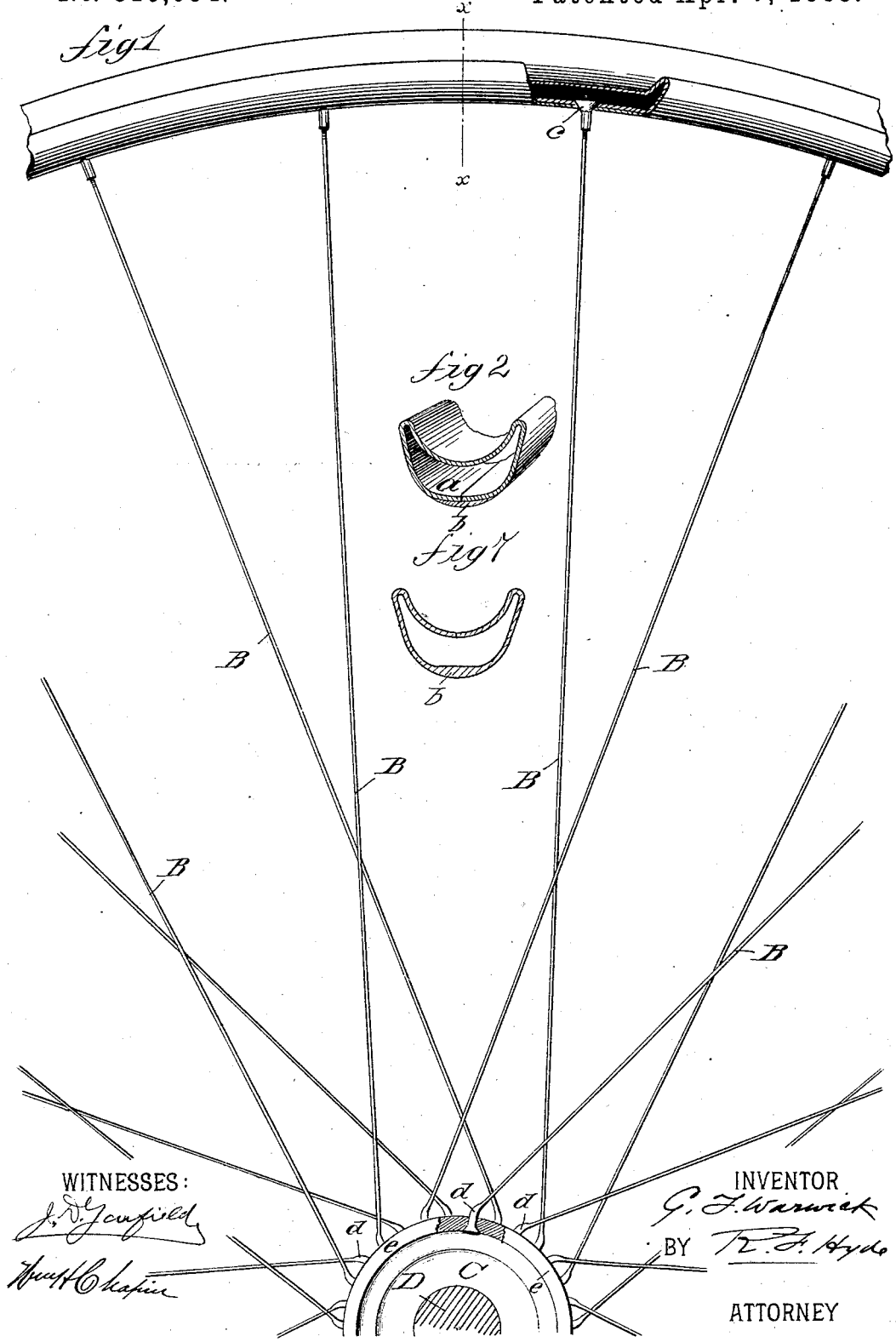
WITNESSES:
INVENTOR
ATTORNEY

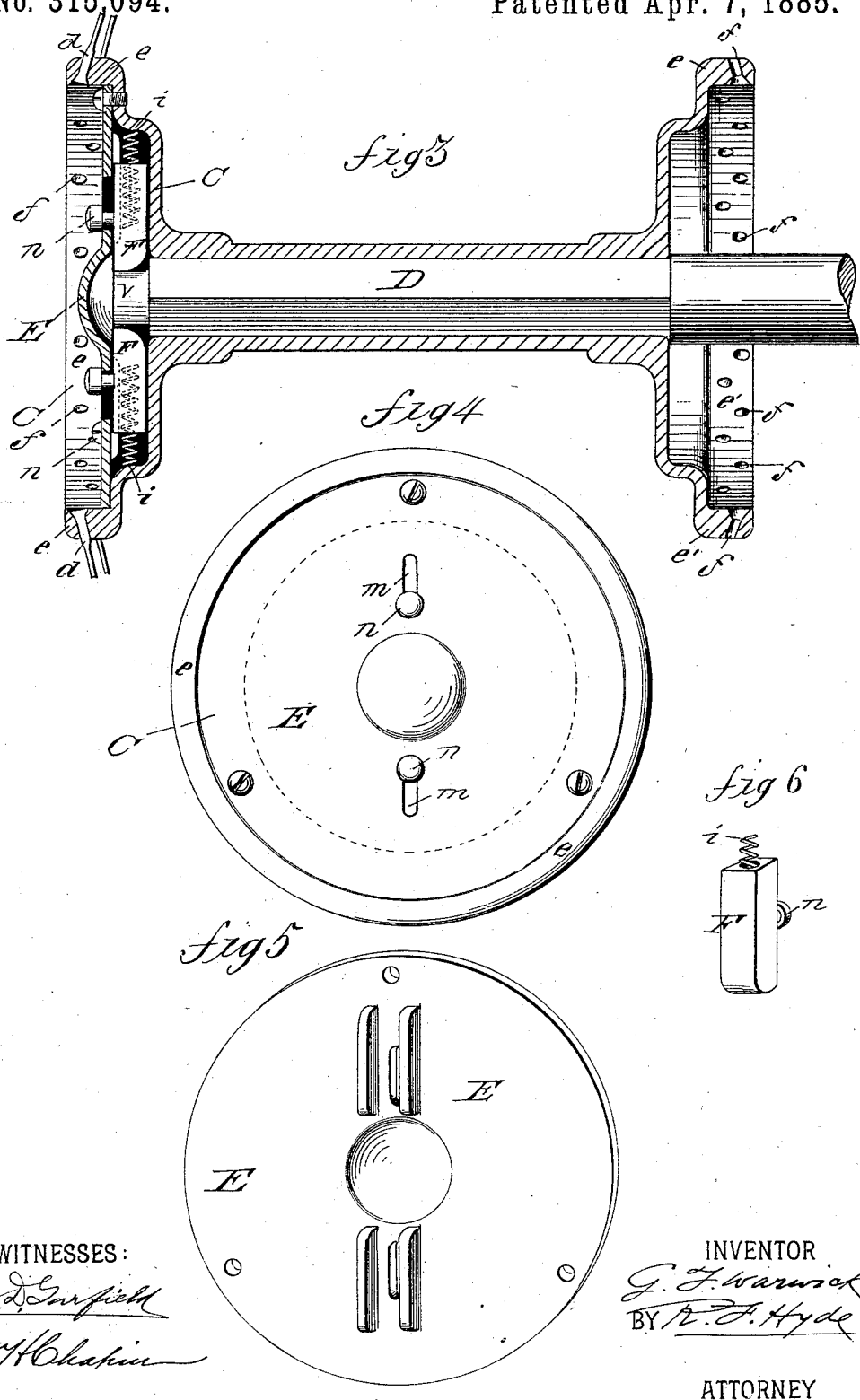

UNITED STATES PATENT OFFICE.

GEORGE T. WARWICK, OF SPRINGFIELD, MASSACHUSETTS.

WHEEL FOR VEHICLES.

SPECIFICATION forming part of Letters Patent No. 315,094, dated April 7, 1885.

Application filed July 19, 1884. (No model.) Patented in England July 17, 1883, No. 3,515.

*To all whom it may concern:*

Be it known that I GEORGE T. WARWICK, a subject of the Queen of Great Britain, residing at Springfield, in the county of Hampden and State of Massachusetts, have invented new and useful Improvements in Wheels for Bicycles and other Vehicles, (for which I have obtained patent in Great Britain for the major part, No. 3,515, dated July 17, 1883,) of which the following is a specification.

My invention relates to improvements in the wheels of bicycles, tricycles, and other vehicles; and the first part consists in an improved rim in which the sheet metal of which it is formed is drawn or rolled into any convenient shape to leave two edges to butt against each other, and combined with a piece of metal so shaped that when it is secured on the under side of the rim by soldering or brazing it forms a strengthening-piece or re-enforce, through which the spokes pass, the object of this part of the invention being to provide an exceedingly light rim with a strong point of attachment thereon for the spokes.

The second part consists in an improved spoke separated each from any other, and provided with an enlarged and headed inner end and bent at said enlarged end, in combination with a corresponding opening in the rim-flange of the hub and radial to the axle, to adapt said spoke to be individually secured to the wheel by having its outer end drawn through said opening in the hub-flange and then swung or turned to seat its inner end therein, to be tightened in the wheel by a suitable draw-nut in its rim, to cause the spoke to take a direction approximately tangential to the perimeter of the hub, and to adapt said spoke or any part of it to be with equal ease withdrawn from the wheel for repair or substitution; and the third part of my invention consists of an improved construction of the hub and axle, in which the hub of the wheel is provided with one or more catches held forward by suitable springs to adapt them to have their ends held in an annular groove upon the end of the axle, and provided with means for actuating said spring-catches to release said axle when it is desired to separate hub and axle, the ends of the spring-catches and the end of the axle being of such configuration as to adapt the hub having the former to be sprung over the latter to be secured in place, the object of this part of the invention being to enable the wheels of vehicles of this class to be quickly withdrawn to permit said vehicle being taken through narrow passages or openings, as well as to admit of repairs being quickly completed.

My invention is fully illustrated in the accompanying drawings, in which Figure 1 is an elevation of a part of a wheel in partial section. Fig. 2 is a section of the rim of the same. Fig. 3 is a longitudinal section of the hub of a wheel combined with the axle. Fig. 4 is a plan view of the outside of the hub. Fig. 5 is a plan view of a part of the hub. Fig. 6 is a detail view of one catch, and Fig. 7 is a cross-section upon *x x* of Fig. 1.

Fig. 2 shows a section through a piece of sheet-steel or other suitable material bent into the shape of an unfinished tube for a tire for a wheel. At *a* the two edges are shown drawn together, and having soldered or brazed over them a re-enforce, *b*.

The re-enforce *b* is in cross-section of the approximate form of a crescent, and when combined with the under surface of the rim supplies a thick wall into which to seat the draw-nuts *c*, while at the same time efficiently strengthening the under arch of the wheel to leave the rest of it thin and light. The re-enforce *b*, when in place upon the rim, has its ends coincide, as seen in Fig. 7, with the outer surface of the rim, to present a flush surface, as shown in Figs. 1 and 7.

Without a departure from the spirit of my invention, the two edges of the sheet forming the rim (shown united at *a*) may come together to be secured at any point in the surface of the rim, to leave the rim of a configuration permitting the re-enforce *b* to be secured thereto, though I prefer to arrange said edges as shown.

B are spokes adapted to be set in the hub C, tangentially to a circle from its axis. The spokes B have enlarged butts *d* formed integral with them. Said butts have heads *d'* at one end, and are reduced at the others to coincide with the surface of the spokes, and the spokes leave said butts at an angle to form a proper tangent, as shown in Fig. 1. The hub C has flanges *e e'*, through which, and radially to the axis of the hub, are holes *f*, conforming to the headed butts d, as more particularly seen in Fig. 1. These holes f, being so much larger than the spokes in diameter, permit a spoke to have its outer end passed through from the inner side of flange e, to be drawn entirely through, to have its screw end secured by a nut, c, in the rim, to seat its butt firmly in the flange, while the butt, enlarging the spoke at its angle of departure therefrom, resists any strain, torsional or otherwise, exerted through the spoke.

C is a hub upon an axle, D. The outer part of the hub is dished to leave the flange e and to receive a disk, E, covering the end of axle D, and forming a case between its inner face and the back of the hub, to contain one or more spring-catches, F. Said catches so framed upon two opposite sides are guided laterally by flanges g upon either of their other sides, and projecting from either the back of the hub or from disk E.

The catches F are provided with springs i, bearing between the perimeter of the hub and the end of said catches, to throw them toward the axis of the hub. Elongated openings m m in disk E permit the stems of screws or buttons n to pass from the catches to the outside of disk E, where the heads of said stems are in convenient reach to permit the catches to be manually operated. The axle D has at its outer end the annular groove v, arranged to come opposite the ends of the catches F, and in practice the ends of said catches are beveled, as shown in Fig. 3, to permit the hub to be snapped into place upon the axle, the rounded head of the axle acting as a wedge to distend the catches until they are released by coming opposite to the groove v, and the plate or disk E forms an end bearing, as shown, to the head of the axle. The hub and axle thus constructed may be quickly combined or separated.

Now, having described my invention, what I claim is—

1. The within-described improvement in the wheels of bicycles, tricycles, and other vehicles, consisting of a sheet-metal rim formed of one continuous piece bent to have its contiguous edges come opposite to each other, and having said edges secured in said position, in combination with a re-enforce, as b, of metal, brazed or soldered upon the outside lower surface of said rim, to be in effect integral therewith, for the purpose set forth.

2. In a velocipede, the combination of a spoke having an inner enlarged end and retaining-head thereon, and bent at one end of said enlargement to have its direction when secured to the wheel a tangent approximately to the perimeter of the hub, a flange upon the hub provided with radial perforations adapted to permit the spoke to be passed therethrough and turned therein to have its main body take a tangential position relative to the hub, and a draw-nut or similar means for uniting spoke and tire, all arranged as shown, and for the purpose set forth.

GEO. THO. WARWICK.

Witnesses:
B. F. HYDE,
WM. H. CHAPIN.